(12) United States Patent
Kato

(10) Patent No.: US 6,637,290 B2
(45) Date of Patent: Oct. 28, 2003

(54) HOUSING OSCILLATING TYPE CAM APPARATUS, AND WORK SHIFTER USING SUCH APPARATUS

(75) Inventor: Heizaburo Kato, Shizuoka (JP)

(73) Assignee: Sankyo Manufacturing Co., Ltd., Tokyo (JP)

( * ) Notice: Subject to any disclaimer, the term of this patent is extended or adjusted under 35 U.S.C. 154(b) by 69 days.

(21) Appl. No.: 09/972,329

(22) Filed: Oct. 5, 2001

(65) Prior Publication Data

US 2002/0043123 A1 Apr. 18, 2002

(51) Int. Cl.[7] .................. F16H 25/08; F16H 25/16; F16H 53/06
(52) U.S. Cl. ............... 74/569; 74/53; 74/84 R; 74/431; 414/222.01; 483/38
(58) Field of Search ................. 74/567–569, 431, 74/813 R, 84 R, 816, 817, 813 C, 813 L, 53; 483/38, 41, 66, 67; 414/222.01

(56) References Cited

U.S. PATENT DOCUMENTS

| | | | |
|---|---|---|---|
| 4,605,392 A | * 8/1986 | Achelpohl et al. | 493/196 |
| 4,630,493 A | 12/1986 | Kato | |
| 4,854,236 A | * 8/1989 | Thunker et al. | 101/411 |
| 5,292,214 A | * 3/1994 | Bishop | 409/307 |
| 5,746,872 A | * 5/1998 | Spatafora et al. | 156/274.2 |
| 5,806,367 A | * 9/1998 | Kato | 74/84 R |
| 6,186,014 B1 | 2/2001 | Kato | |
| 6,324,943 B1 | * 12/2001 | Sahara | 74/813 R |

FOREIGN PATENT DOCUMENTS

| | | | | |
|---|---|---|---|---|
| EP | 0052149 A | | 5/1982 | |
| GB | 2233728 A | * | 1/1991 | 74/569 |
| JP | 60-31545 | | 3/1985 | |
| JP | 64-1830 | | 1/1989 | |
| JP | 8-316285 | * | 11/1996 | 74/569 |

* cited by examiner

Primary Examiner—Vinh T. Luong
(74) Attorney, Agent, or Firm—Harness, Dickey & Pierce, P.L.C.

(57) ABSTRACT

A housing (21) which comprises an input shaft (22) and a second output shaft rotatably supported in a housing (21), and a first output shaft (23) rotatably supported to be movable in the axial direction as well as the rotational direction, a first cam mechanism (25A) which transmits the rotation of the input shaft (22) to a rotation movement of the first output shaft (23), a second cam mechanism (25B) which converts the rotation of the input shaft (22) to an oscillating rotation of the second output shaft (24) and transmits it, a third cam mechanism (25C) which converts the rotation of the input shaft (22) to an oscillating rotation of the second output shaft (24) and transmits it, and the housing (21) is rotatably supported capable of oscillating to a fixed system such as a base by a supporting shaft, and a link mechanism for converting the oscillating rotation of the second output shaft (24) to an oscillating movement of the housing (21) is provided in between the second output shaft (24) and the fixed system to construct the housing oscillating type cam apparatus (20). Work transporting arms are attached to the first output shaft of the cam apparatus to form a work shifter.

3 Claims, 8 Drawing Sheets

HOUSING OSCILLATING TYPE CAM APPARATUS, AND WORK SHIFTER USING SUCH APPARATUS

The present application is related to Japanese Patent Application No. 2000-194215 filed on Jun. 28, 2000.

BACKGROUND OF THE INVENTION

1. Field of the Invention

The present invention relates to a cam apparatus suitable for application to various automatic machine tools or the like capable of making an output shaft conduct complex movements (a rotational movement and a reciprocal movement in the axial direction thereof) as well as oscillating a housing itself, and to a work shifter using the cam apparatus thereof.

2. Description of the Related Art

Generally, as a work shifter having a work holder which transfers a workpiece to each other between two machines, there is, for example, a tool shifter of a machine tool. This tool shifter takes out a tool held in a tool pot which is accommodated inside a tool rack, and a tool held in a tool pot of a waiting magazine at the side thereof by a transporting arm with an NC order or the like, and subsequently replaces each other and holds the tool in the tool pot. In such a tool shifter, the transporting arm therein may be driven by the cam apparatus.

Incidentally, as such a type of cam apparatus, there is known a cam mechanism where the input shaft and the output shaft are disposed perpendicular to each other in the housing, they are rotatably supported in the housings respectively, as well as the output shaft being further supported in the axial direction thereof to slidably move, and between the input shaft and output shaft is provided a cam mechanism for converting a rotation motion at a constant speed of the input shaft into a normal and reverse rotation motion and a reciprocal motion in the axial direction of the output shaft.

The above cam mechanism is comprised of a roller gear cam fixed to the input shaft, a follower turret spline-engaged to the output shaft and supported rotatably in the housing and also where the cam follower is engaged to the taper rib formed in the outer surface of the above roller gear cam, and an oscillation arm in which the point of support thereof is rotatably supported by the housing, the point of force thereof is engaged with an endless groove cam formed at the one surface of the above roller gear cam, and the point of action thereof is engaged with an annular groove formed at the outer peripheral surface of the output shaft, in which the output shaft reciprocally rotates via the follower turret according to the displacement of the taper rib in the input shaft direction when the input shaft rotates Incidentally, when the above cam apparatus (pick and place apparatus) is made to drive a transporting arm or the like of the tool shifter, a detaching movement such as inserting or extracting a tool by the transporting arm to a holder by a reciprocal motion in the axial direction of the output shaft, and a moving/waiting movement such as reciprocal moving and waiting of the tool from the tool rack transfer position to the waiting magazine tool holding position by a reciprocal rotation motion or an intermittent rotation motion may be conducted. However, if the tools are held close to each other within the rack to increase accommodation efficiency, in view of interference with adjacent tools when engaging the transportation arm to the tool, it becomes difficult to revolve the transporting arm for engagement.

Therefore, in such a case, it becomes necessary for the transporting arm to have a structure capable of linearly contracting and expanding, and to have a mechanism to operate contraction-expansion therein, and this contraction expansion operating mechanism has to electrically sequentially control the driving apparatus such as an electric motor which is provided separately.

Nevertheless, when the operation of the contraction-expansion operating mechanism in an electric circuit is controlled according to the movement of the above transporting arm, the completion of each action of the transporting arm should be confirmed before operating the driving apparatus of the contraction-expansion operating mechanism, so that the loss time of the operational control becomes large and the electric circuit becomes extremely complex (especially, when it is necessary to overlap the timing of the action, the circuit becomes more complex and setting becomes harder). Thus, there was a problem of increasing the manufacturing cost.

SUMMARY OF THE INVENTION

The present invention is made in view of the above matters, and an object is to provide a housing oscillating type cam apparatus which can slide a cam apparatus itself and move the position of an output shaft as approximate to a linear shape as possible, further the sliding motion may be obtained from the rotation of an input shaft of the cam apparatus to slide in synchronous with the action of the output shaft, and to provide a work shifter using the housing oscillating type cam apparatus.

In order to achieve the above object, in a housing oscillating type cam apparatus according to claim 1 of this invention, a cam apparatus comprises: an input shaft rotatably supported in a housing; a first output shaft rotatably supported in the axial direction to slidingly move in the housing; a second output shaft rotatably supported in the housing; a first cam mechanism which transmits the rotation of the input shaft to the rotation movement of the first output shaft; a second cam mechanism which converts the rotation of the input shaft into a reciprocal movement in the axial direction of the first output shaft and transmits it; and a third cam mechanism which converts the rotation of the input shaft into a sliding rotation of the second output shaft and transmits it, wherein the housing oscillating type cam apparatus rotatably supports the housing slidably in a fixed system such as a base, as well as providing a link mechanism in between the second output shaft and the fixed system to convert the sliding rotation of the second output shaft into a sliding movement of the housing.

In the housing oscillating type cam apparatus of the present invention constructed as above, the input shaft not only expands and contracts in the rotational and axial direction according to the rotation of the input shaft, but the whole cam apparatus slides, so that the position on a plane of the first output shaft may be mechanically controlled synchronously with the movement of the first output shaft, without having to provide separately a power source or for control thereof a complex electric circuit, and an operation mechanism or the like, further it may be moved as close to a linear shape as possible.

Further, in the housing oscillating type cam apparatus of the invention according to claim 2, the first output shaft is provided intersecting the input shaft perpendicularly, as well as the second output shaft being provided parallel to the input shaft, whereby the first cam mechanism comprises a roller gear cam fixed to the input shaft and having a taper rib with a predetermined geometrical curve on the outer surface, a follower turret allowing movement in the axial direction of the first output shaft and provided to spline engage to the same shaft on the outer side of the first output shaft as well as being rotatably supported in the housing, and a cam follower provided on the outer surface of the follower turret and engaging in the taper rib of the roller gear cam, the second cam mechanism comprises an endless first groove cam provided at one surface of the roller gear cam and having a predetermined geometrical curve, and a first oscillating arm in which the supporting point rotatably supported in the housing, the point of force is engaged to the first groove cam as well as the point of action being engaged to the groove portion formed at the outer side of the first output shaft, the third cam mechanism comprises an endless second groove cam provided at the other surface of the roller gear cam and having a predetermined geometrical curve, and a second oscillating arm of one end which is fixed to the inner side shaft of the second output shaft and the other end is engaged to the second groove cam, and the link mechanism comprises a third oscillating curve of one end which is fixed to the outer side shaft of the second output shaft and the other end extends in the axial direction, and a connecting bar of which one end is rotatably supported to the extended end of the third oscillating arm and the other end is rotatably supported to the fixed system.

In the housing sliding type cam apparatus of the present invention as structured above, when the input shaft rotates, the first oscillating arm of which the point of force is engaged to the first groove cam of the roller gear cam slides up and down according to the rotation angle, and the oscillation of the first oscillating arm is transmitted to the first output shaft which is slidably supported by a bearing portion of a casing and a follower turret, and the first output shaft reciprocally moves up and down along the axial direction. Further, at the same time, the taper rib of the roller gear cam is displaced in the axial direction of the input shaft according to the rotation angle of the input shaft, and according to this displacement the follower turret which is engaged with a cam follower at the taper rib is rotatingly moved appropriately with the outer shape of the taper rib. Then, the rotation movement of the follower turret is transmitted to the first output shaft which is spline-fitted to the inner side thereof. As a result, the first output shaft reciprocally moves in the axial direction as described above as well as rotatingly moves around the shaft.

On the other hand, the second oscillating arm of which the oscillating end is engaged to the second groove cam of the roller gear cam, is oscillated by the rotation of the input shaft according to the rotation angle thereof, and thereby the second output shaft is oscillatingly rotated, and the oscillation rotation in synchronous with the complex movement of the first output shaft is obtained by the second output shaft. Then, with this oscillating rotation the extended end of the third oscillating arm oscillates, and since the extended end is provided with a connecting bar connecting with the fixed system, take reaction force to the fixed system via the connecting bar, and the housing makes a sliding movement in synchronous with the complex movement of the first output shaft in accordance with the oscillation of the third oscillating arm. Therefore, by the oscillating movement of the housing, the position on a plane of the first output shaft, may be mechanically controlled synchronously with the movement of the first output shaft, without using a complex electric circuit, and may be moved as close as possible to a linear shape. Moreover, the rotation of the input shaft is converted to a rotational/contracting and expanding movement of the first output shaft and an oscillating movement of a housing via a positive cam without saccadic movement such as a roller gear cam or a groove cam. Thus, a housing oscillating type cam apparatus with extremely high movement accuracy and reliability may be obtained.

A work shifter of the present invention according to claim 3, is provided in the center of the two work holder machines, the workpiece held in one of the work holder machines is transported to the other work holder machine, whereby the work shifter comprises a housing oscillating type cam apparatus according to claims 1 or 2, and a work transporting arm fixed to the first output shaft of the housing oscillating type cam apparatus and having a work holder at the tip end portion extending in the radial direction of the first input shaft; wherein the first output shaft revolves the tip end of the work transporting arm and alternately stations towards both the work holder machine sides; the housing oscillating type cam apparatus oscillates and moves towards the tip end direction of the work transporting arm in the stationary period when the work transporting arm is stationary; and the first output shaft extends or contracts and slidably moves during the stationary period of the housing oscillating type cam apparatus.

In the work shifter of the present invention structured as described above, the housing oscillating type cam apparatus may oscillate itself by moving the position of the first output shaft approximate to a linear shape, and also such oscillating motion may be obtained from the rotation of the input shaft of the cam apparatus itself, to be synchronous with the motion of the first output shaft and oscillate. Therefore, a complex construction to sequentially control a transporting arm with a structure that is extendable linearly with a driving device such as an electric motor provided separately does not need to be used, and multiple workpieces held close to the work holder may be engaged with a transporting arm to avoid interference with the adjacent workpiece. Thus, cost reduction of the work shifter may be realized. Further, with the oscillating movement of the housing, the workpiece may be moved more than for the length of the transporting arm, so that even in a case there is a distance between the two work holder machines, work transporting may be conducted coping with the situation. Contrarily, even in a case that the distance is close, the transporting arm may be formed short to conduct the workpiece transporting. Thus, the work shifter may be provided in a narrow space.

BRIEF DESCRIPTION OF THE DRAWINGS

FIG. 1 shows a housing oscillating type cam apparatus according to the present invention, where

FIG. 9 is an operational timing diagram of the housing oscillating type cam apparatus used in the tool shifter, where

FIG. 10 is a diagram explaining the operational state of the tool shifter corresponding to the above timing diagram where

FIG. 11 is a diagram explaining the operational state of the tool shifter corresponding to the above timing diagram where

DESCRIPTION OF THE PREFERRED EMBODIMENTS

Hereinbelow an appropriate embodiment of the present invention is described in detail based on the attached drawings.

Figure 1A:
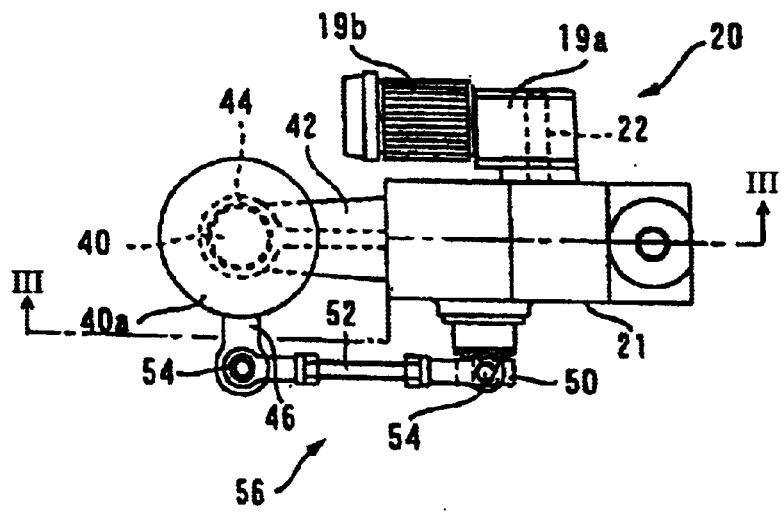
FIG. 1A is a plan view.
Figure 1B:
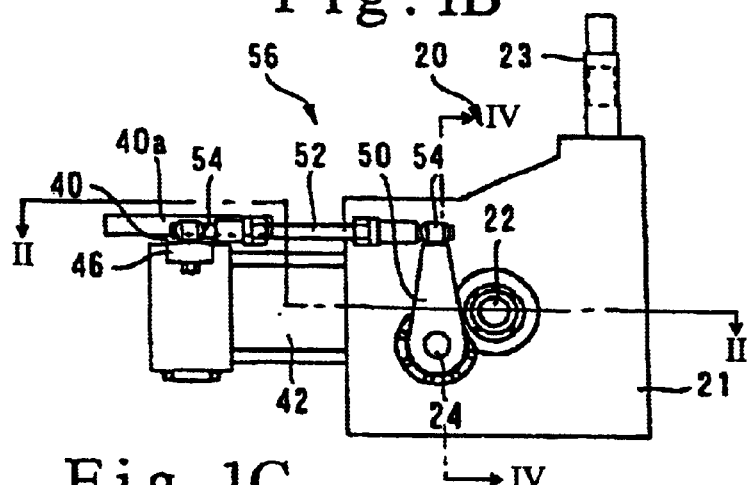
FIG. 1B is a side view.
Figure 1C:
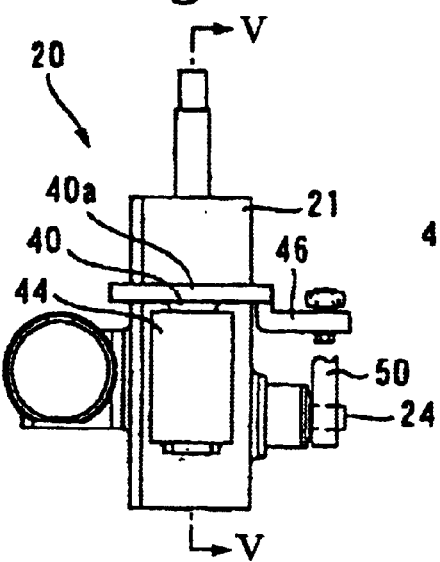
FIG. 1C is a front view.
Figure 1D:
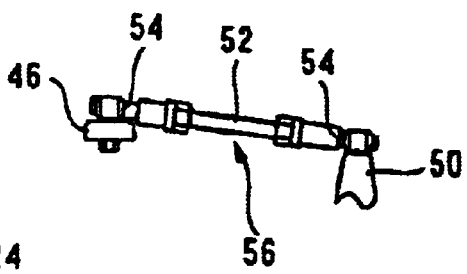
FIG. 1D is a partial view showing a connecting bar.
Figure 2:
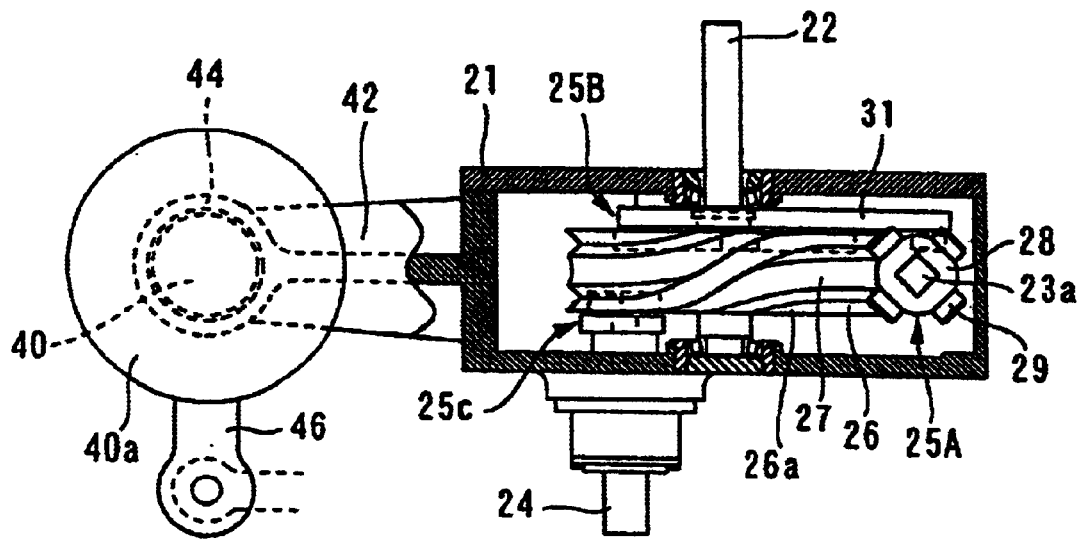
FIG. 2 is a sectional view taken on line II—II of FIG. 1B.
Figure 3:
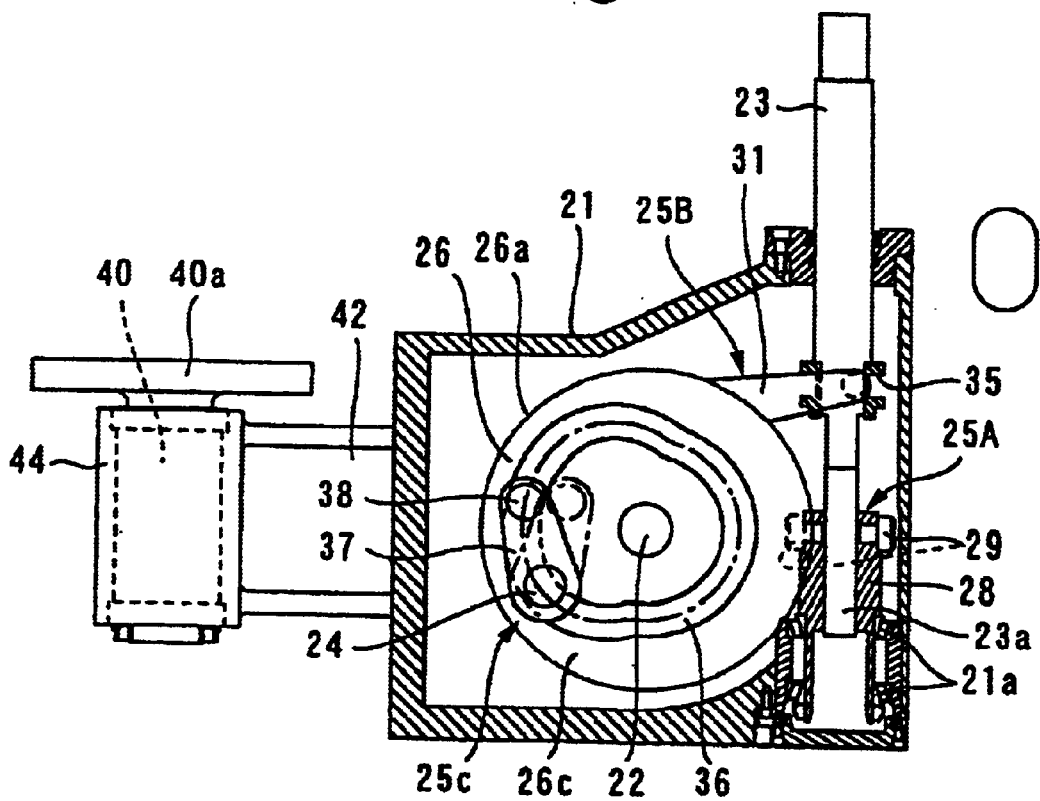
FIG. 3 is a sectional view taken on line III—III of FIG. 1A.
Figure 4:
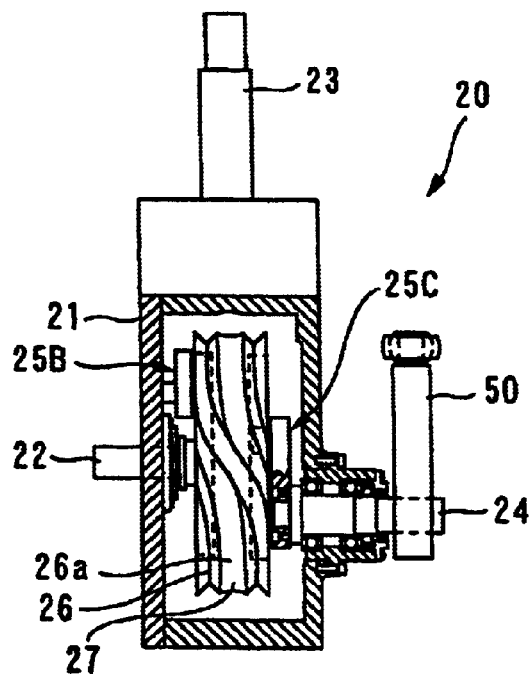
FIG. 4 is a sectional view taken on line IV—IV of FIG. 1B.
Figure 5:
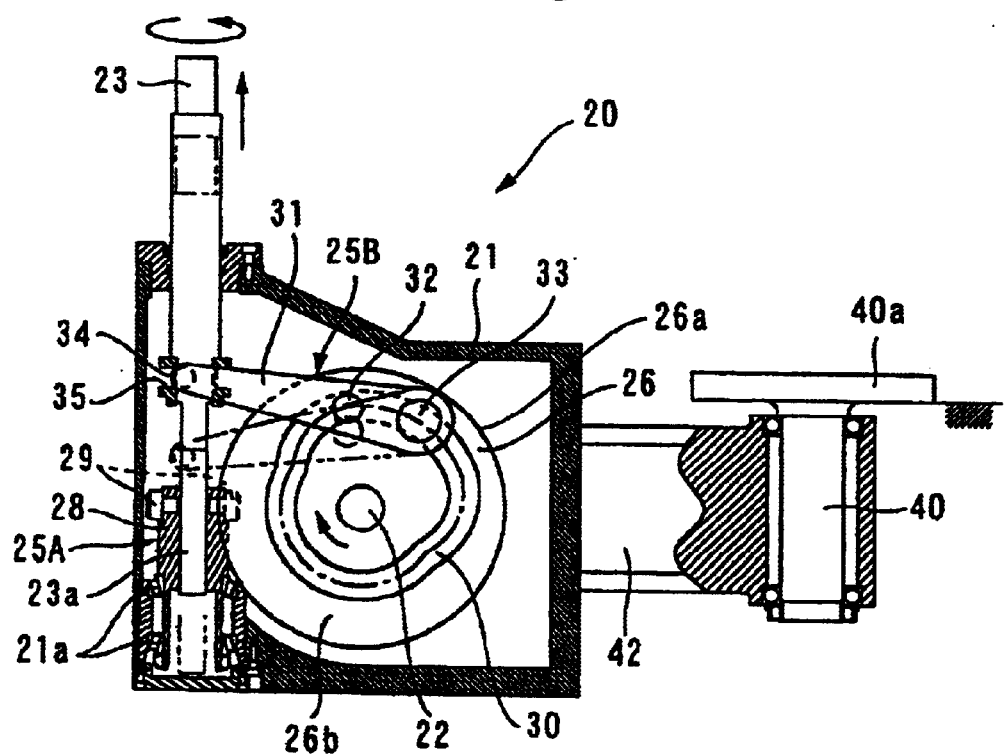
FIG. 5 is a sectional view taken on line V—V of FIG. 1C.

FIG. 1 shows a housing oscillating type cam apparatus according to the present invention, where FIG. 1A shows a plan view, FIG. 1B shows a side view, FIG. 1C shows a front view, and FIG. 1D shows a partial view of a connecting bar. FIG. 2 is a partial sectional view showing the inside of the housing portion of FIG. 1A cutaway, FIG. 3 is a partial cross sectional view showing the inside of the housing portion of FIG. 1B cutaway, and FIG. 4 is a partial sectional view showing the inside of the housing portion of FIG. 1C cutaway. Further, FIG. 5 is a partial sectional view showing the inside of the housing portion of FIG. 1B cutaway at the back-side.

As shown in the figures, the housing oscillating type cam apparatus 20 is mainly constructed by, a housing 21, an input shaft 22 which is rotatably supported by the housing 21, a first output shaft 23 which is arranged to cross at a right angle with the input shaft 22 and is rotatably supported slidably by the housing 21 in the axial direction, a second output shaft 24 arranged in parallel to the input shaft 22 and is rotatably supported by the housing 21, a first cam mechanism 25A interposed between the input shaft 22 and the first output shaft 23 or the second output shaft 24, and converts the rotation movement of the input shaft 22 to an intermittent rotation movement of the first output shaft 23 and transmits it, a second cam mechanism 25B which converts the rotational movement of the input shaft 22 to a reciprocating movement in the axial direction of the first output shaft 23 and transmits it, and a third cam mechanism 25C which converts the rotational movement of the input shaft 22 to an oscillating rotational movement of the second output shaft 24 and transmits it. The cam mechanisms 25A, 25B and 25C are constructed as below.

Namely, in the housing oscillating type cam apparatus 20, the input shaft 22 is arranged in a horizontal direction, this input shaft 22 is fixed with a roller gear cam 26 at the same shaft, and on an outer circumferential surface 26a of the roller gear cam 26 is formed a taper rib 27 having a predetermined spiral geometrical curve, which is displaced along the axial direction of the input shaft 22 according to the rotation angle of the input shaft 22.

On the otherhand, the first output shaft 23 is arranged in a vertical direction, and at the lower end portion of this first output shaft 23 is formed a spline shaft portion 23a which forms a square shape in a horizontal cross section. This spline shaft portion 23a is provided with a follower turret 28, which is spline-fitted on the same shaft and is allowed to slidably move in the axial direction of the first output shaft 23, as well as being rotatably supported by the housing 21 at the lower end of the outer surface by bearings 21a, which is restricted of movement in the axial direction freely in a reciprocating rotation. Further, on the outer surface circumference of the top end of the follower turret 28 are arranged a plurality of cam followers 29 in equal intervals. Of these neighboring cam followers 29, two of them sequentially engage with the taper rib 27 to sandwich the taper rib 27 from the right and left sides (the top and bottom in FIG. 2).

Further, as shown in FIG. 5, one surface 26b of the roller gear cam 26 is engraved with an endless first groove cam 30 having a predetermined geometrical curve where the distance from the shaft core is displaced according to the rotation angle of the input shaft 22. This first groove cam 30 is engaged with a first rotator 32 which is provided at the point of force at substantially the center part of the first oscillating arm 31. A point of support 33 at one end of the oscillating arm 31 is rotatably supported swingingly by the housing 21, and the second rotator 34 provided at the point of action at the other end is engaged in the circular groove portion 35 formed at the outer peripheral side of the first output shaft 23.

In other words, the first cam mechanism 25A is comprised of the roller gear cam 26, the turret 28, the cam follower 29 and the like, and the second cam mechanism 25B is comprised of such as the first cam 30, the first oscillating arm 31, the first and second rotator 32, 34 and the annular groove portion 35.

Further, the other surface 26c of the roller gear cam 26 is engraved with an endless second groove cam 36 having a predetermined geometrical curve where the distance from the shaft core is displaced according to the rotation angle of the input shaft 22. This second groove cam 36 is engaged with a rotator 38 which is the other oscillating end of the second oscillating arm 37 that is provided with one end fixed to the second output shaft 24. Namely, the third cam mechanism 25C is comprised of the second groove cam 36, the second oscillating arm 37, the rotator 38 and the like.

Note that, the above first and second groove cams 30, 36 do not necessarily have to be formed integrally by direct engraving to the surfaces 26b, 26c of the roller gear cam 26, and may be formed on a separate disc and be provided as integrally fixed.

Therefore, in this housing oscillating type cam apparatus 20, when the input shaft 22 rotates, the first oscillating arm 31 of which the point of force thereof is engaged to the first groove cam 30 of the roller gear cam 26 oscillates up and down according to the rotating angle, the oscillation of this first oscillating arm 31 is transmitted to the first output shaft 23 slidably supported by the bearing portion and the follower turret 28 of the housing 21, and the first output shaft 23 reciprocally moves up and down along the axial direction.

Simultaneously, the taper rib 27 of the roller gear cam 26 is displaced in the axial direction of the input shaft 22 according to the rotation angle of the input shaft 22. With the follower turret 28 in which according to the above displacement the taper rib 27 is engaged with the cam follower 29, the cam follower 29 subsequently engages with the taper rib 27 and fits with the outer shape of the taper rib 27 for an intermittent rotating motion. Then, the rotational motion of this follower turret 27 is transmitted to the first output shaft 23 which is spline-fitted to the inner surface of the follower turret 27. As a result, the first output shaft 23 reciprocally moves in the axial direction as described above, as well as rotationally moves around the shaft.

On the other hand, the second oscillating arm 37 of which the rotator 38 of the oscillating end is engaged to the second groove cam 36 of the roller gear cam 26, oscillates according to the rotation angle due to the rotation of the input shaft 22, thereby the second output shaft 24 oscillatingly rotates. By this second output shaft 24, the oscillating rotation which synchronizes with the complex movement of the above first output shaft 23, is obtained.

Incidentally, the housing 21 of the housing oscillating type cam apparatus 20 is provided by being rotatably supported by the support shaft 40 which is provided fixed to a fixed system such as a base. In the example of the diagram, the housing 21 is integrally formed with a supporting arm 42 which extends sidewardly and orthogonal to the second output shaft 24. This supporting arm 42 is integrally formed with a boss portion 44 at the tip end, and this boss portion 44 is rotatably supported by the supporting shaft 40. Further, the supporting shaft 40 which is provided fixed to a fixed system is integrally formed with a flange 40a having a larger diameter than the boss portion 44, and adjacent to the boss portion 44. This flange 40a is integrally formed with a reaction receiving rod 46 which extends further outward in the radial direction thereof.

Further, the second output shaft 24 is provided with a third oscillating arm 50 of which one end is fixed to a shaft end portion protruding outwards from the housing 21. The other end of the third oscillating arm 50 extends upwards in the radial direction thereof, and the tip end extends to substantially the same height as the above reaction receiving rod 46. Then, a connecting bar 52 is provided connecting the extended end of the third oscillating arm 50 and the extended end of the reaction receiving rod 46. Here, both ends of this connecting bar 52 are rotatably connected and rotatably supported to both the third oscillating arm 50 and the reaction receiving rod 46 via the respective pole joints 54, 54.

Therefore, when the third oscillating arm 50 tries to oscillate by the oscillating rotation of the second output shaft 24, since the tip end thereof is restrained by the connecting bar 52 connected to the reaction receiving rod 46 which is a fixed system, the reaction is taken to the reaction receiving rod 46 through the connecting bar 52, and contrarily the housing 21 oscillatingly moves with the supporting shaft 40 as the center. That is, the third oscillating arm 50 and the connecting bar 52, the pole joints 54, 54, the reaction receiving rod 46 and the like construct a link mechanism 56 for converting the oscillating rotation of the second output shaft 24 to the oscillating movement of the housing 21.

Accordingly, with this housing oscillating type cam apparatus 20, the housing 21 oscillates around the supporting shaft 40 in synchronous with the motion of the first output shaft 23, and thus the position of the first output shaft 23 may be moved on a plane in an arc-shaped oscillation locus with the supporting shaft as the center. Namely, by setting the distance between the supporting shaft 40 and the first output shaft 23 as long and by having a revolution radius of the first output shaft 23 as large, in respect to the distance between both ends in the oscillation revolution scope of the first output shaft 23, the revolution oscillating locus of the first output shaft 23 may be approximated to a linear state. Note that, 19a in FIG. 1 is a transmission connected to the input shaft 22 and fixed to the housing 21, and 19b is an electric motor of a prime motor.

As an example of an applicable object of such a housing oscillating type cam apparatus 20, for example a work shifter set in the center of two work holding machines, where a workpiece held in one of the work holding machines is transported to the other work holding machine may be employed.

Figure 6:
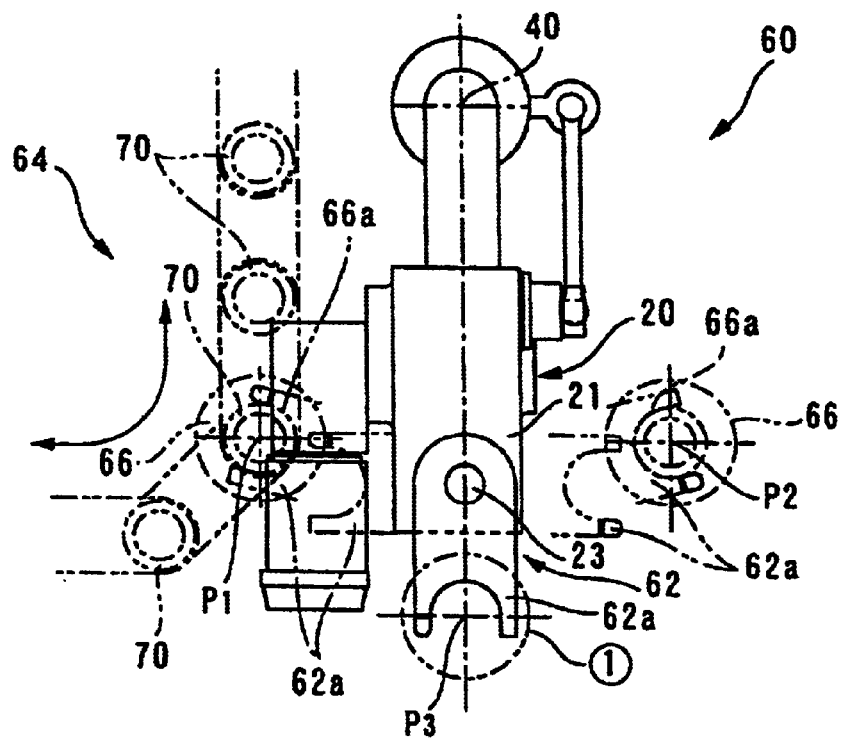
FIG. 6 is a plan view showing a tool shifter which is a specific example of a work shifter according to the present invention.
Figure 7:
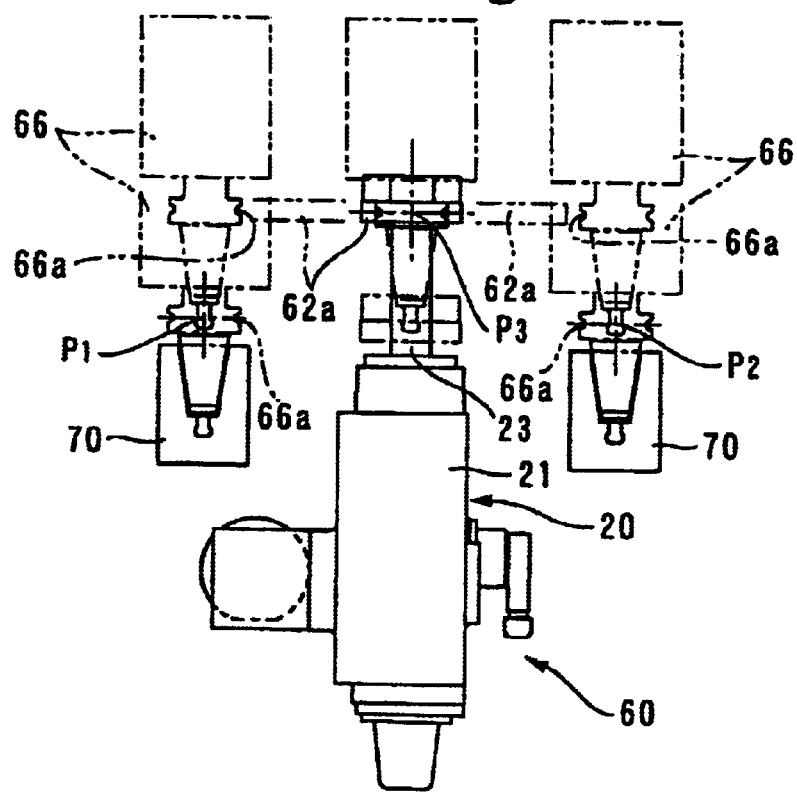
FIG. 7 is a front view showing the tool shifter which is a specific example of the work shifter according to the present invention.
Figure 8:
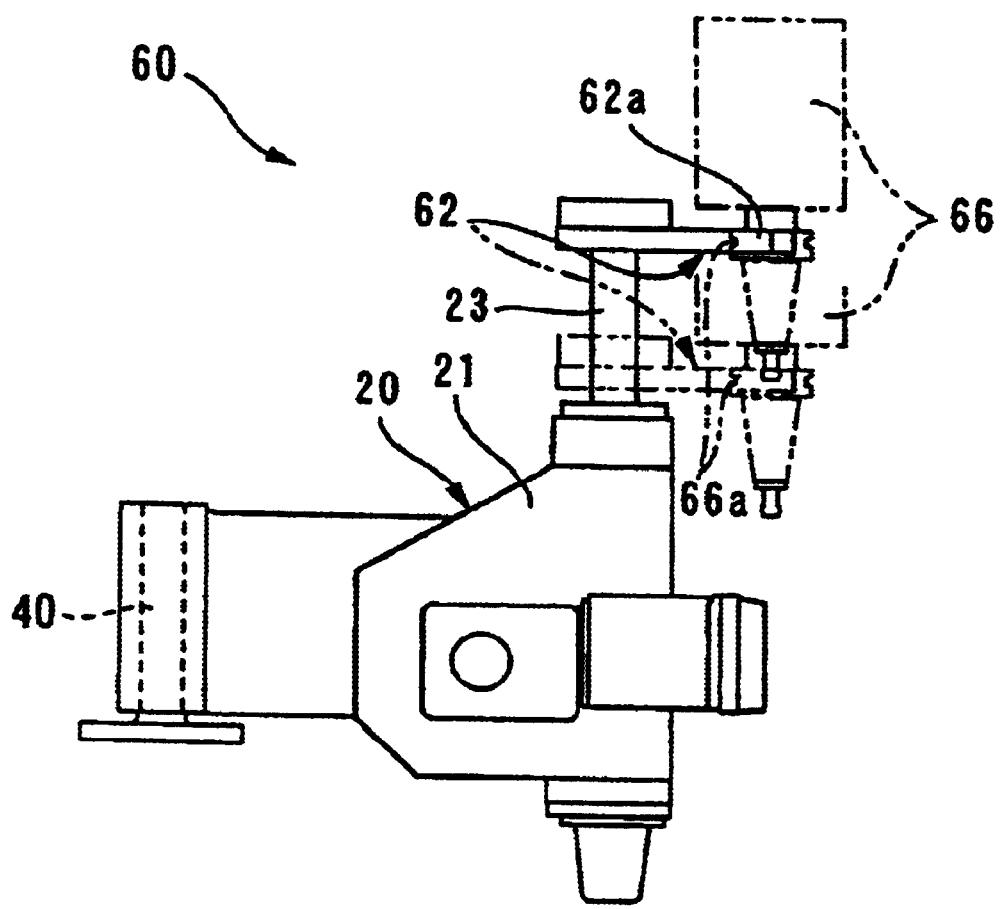
FIG. 8 is a side view showing the tool shifter which is a specific example of the work shifter according to the present invention.

FIGS. 6 to 8 show the tool shifter as a specific example, as a preferred embodiment of the work shifter constructed by comprising the above housing oscillating type cam apparatus 20. FIG. 6 is a plan view, FIG. 7 is a front view, and FIG. 8 is a side view thereof. As shown in the drawings, the tool shifter 60 has the housing oscillating type cam apparatus 20 as the main body, and provides fixed on the shaft end of the first output shaft 23 which protrudes outside of the housing 21, a tool (workpiece) transporting arm 62 extending outwardly in the radial direction, and at the tip end of the tool transporting arm 62 is a hook 62a branched in two as a work holding measure.

This tool shifter 60 is disposed at the center between one of the work holding machines, a tool rack 64 and a waiting magazine (not shown) which is the other work holding machine, and transports the tool. The hook 62a at the tip end of the tool transporting arm 62 reciprocally moves between a tool transfer position P1 of the tool rack 64 and a tool transfer position P2 of the waiting magazine.

That is, the supporting shaft 40 of the housing oscillating type cam apparatus 20 is fixed to a fixed system such as a base perpendicularly (this is in a case of a vertical shape, and level in the case of a horizontal shape) in a position set apart enough from both transfer positions P1, P2 on a bisector of a line connecting both transfer positions P1, P2. Namely, the distance between the first output shaft 23 and the supporting shaft 40 is taken and set as large.

Further, at the oscillating middle point position P3 of the housing 21, the tool transporting arm 62 is made to face sideways with the revolving action of the hook 62a at the tip end towards both the transfer positions P1 and P2 side by the rotation of the first output shaft 23, and the length of the tool transporting arm 62 is set so as not to interfere with the tool 66 which is stopped at each transfer position P1 and P2 at the tool rack side and the waiting magazine side and a holder 70 thereof. Then, the housing 21 swings towards the tool 66 at the hook 62a side in a state the hook 62a is facing sideways, and the first output shaft 23 expands and contracts to move the transporting arm 62 up and down, thereby conducting the receiving and transfer of the tool 66.

That is, the first output shaft 23 revolves the tip end of the work transporting arm 62a alternately to both the sides of the work holding machines, and while this transporting arm 62 is stationary, the housing oscillating type cam apparatus 20 swingingly moves with a stationary period in the top end direction of the transporting arm 62a, and in a stationary period of the housing oscillating type cam apparatus 20, the first output shaft 23 extends or contracts in the axial direction to slidingly contact. This movement will be described later below referring to FIG. 9 which is a timing diagram.

Note that, the above tool rack 64 is provided with multiple tool holders 70 in equal intervals on a conveying apparatus such as an endless plate conveyor which is rotatable in the normal or reverse direction. In the respective holders 70 various tools 66 are accommodated detachably in the axial direction of the holders 70. At the tool transfer (attaching and detaching) position P1 from the tool rack 64 to the transporting arm 62a, the shaft core of each holder 70 is vertical (level in a case of a horizontal type), and each tool 66 is provided with an engaging groove 66a which engages to the hook 62a formed at the tip end portion of the transporting arm 62. Further, although not shown, the waiting magazine is provided with a plurality of tool holders at an equal interval on the outer side of the drum which is rotatable in the normal or reverse direction, and the respective holders are accommodated with various tools in the axial direction of the holder detachably. The transfer (attachable and detachable) position P2 from the waiting magazine of the respective tools to the transporting arm becomes an upper end portion position when the shaft core of each holder becomes vertical.

Figure 9A:
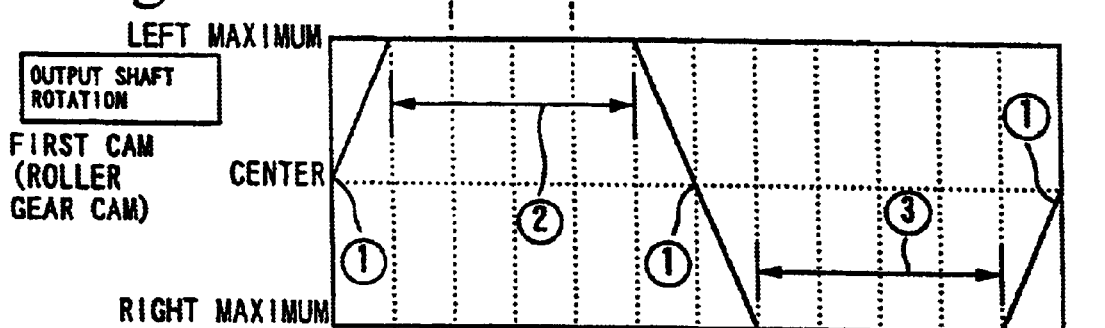
FIG. 9A depicts the output shaft rotation.
Figure 9B:
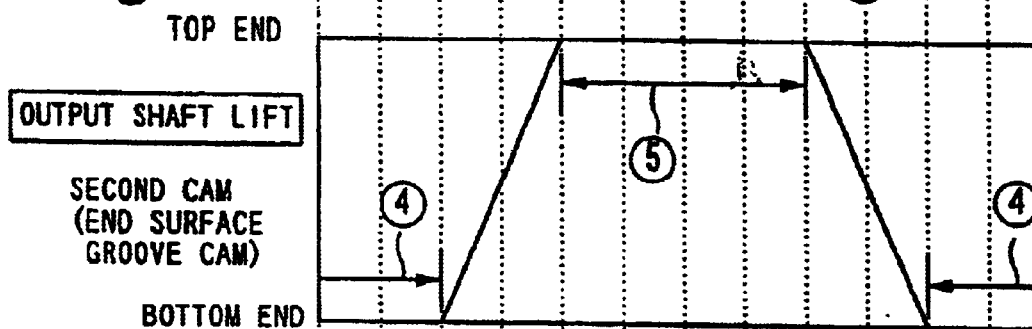
FIG. 9(B) depicts the output shaft lift.
Figure 9C:
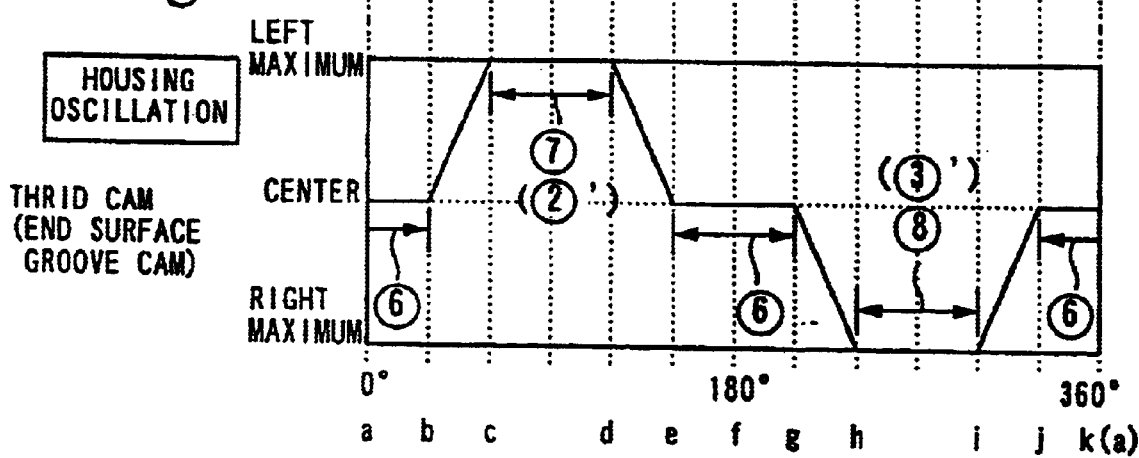
FIG. 9C depicts the housing oscillation.
Figure 10A:
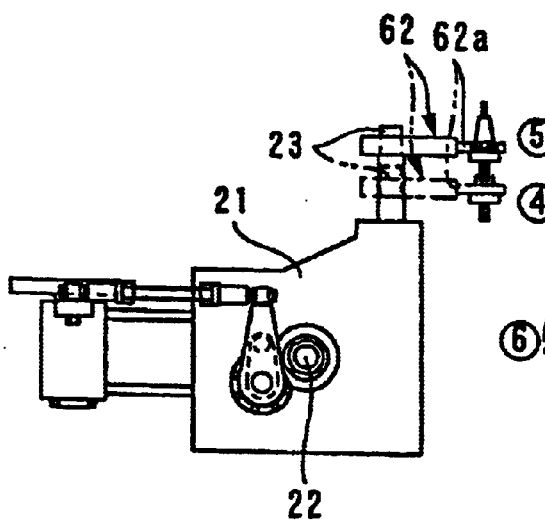
FIG. 10A is a side view and FIG. 10B is a plain view showing the tool shifter in an operational state corresponding to FIG. 9A.
Figure 10B:
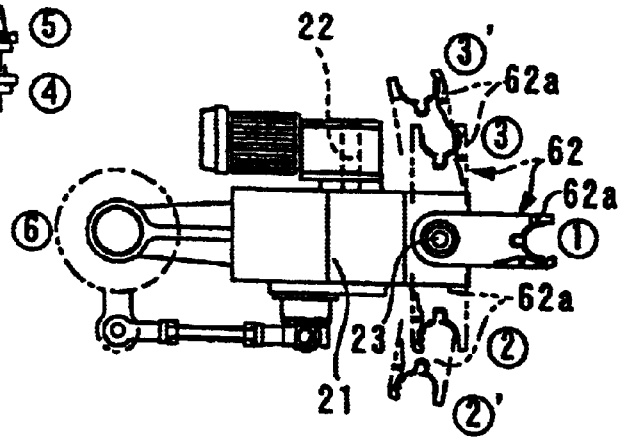
Figure 11A:
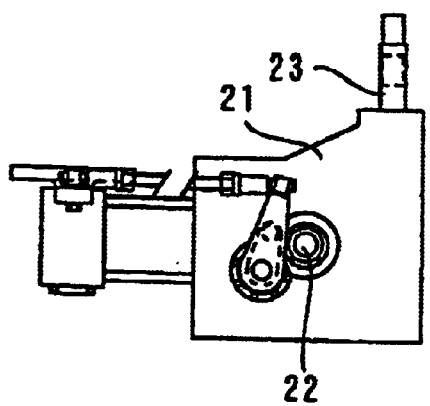
FIG. 11A is a side view and FIG. 11B is a plain view showing the tool shifter in an operational state corresponding to FIG. 9B.
Figure 11B:
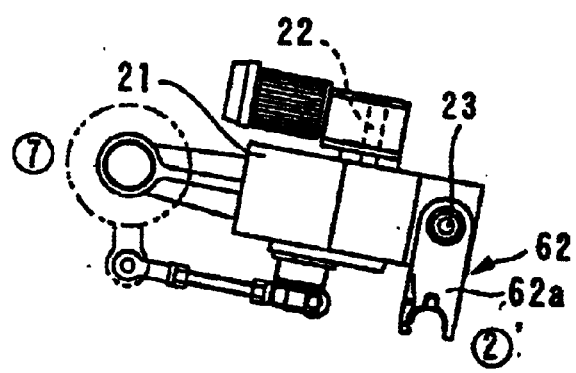
Figure 12A:
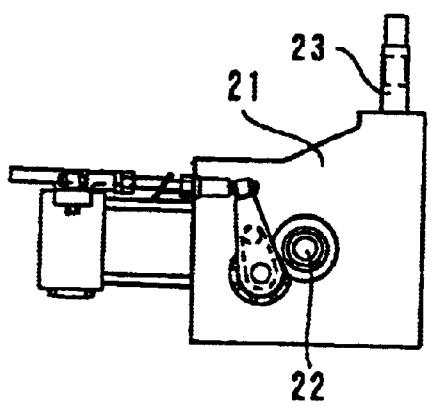
FIG. 12 is a diagram explaining the operational state of the tool shifter corresponding to the above timing diagram where 12A is a side view and FIG. 12B is a plain view showing the tool shifter in an operational state corresponding to FIG. 9C.
Figure 12B:
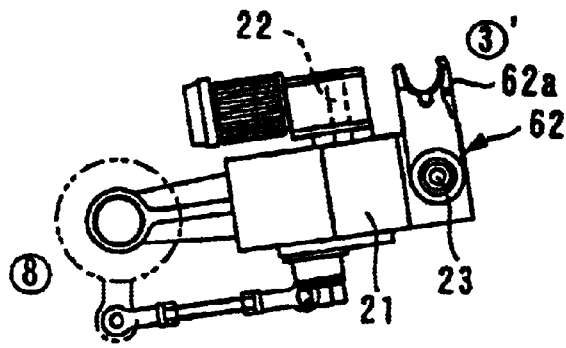

FIG. 9 is a timing diagram, where the horizontal axis is a rotation angle of the input shaft 22 of the cam apparatus 20, and the vertical axis shown by FIG. 9A is the revolving angle (the rotation angle of the first output shaft 23) of the transporting arm 62, shown by FIG. 9B is the lifting amount in the shaft direction of the transporting arm 62 (movement amount in the axial direction of the first output shaft 24), and shown by FIG. 9C is the oscillation angle of the housing 21 (oscillating rotation angle of the second output shaft 24). Further, FIGS. 10 to 12 show the operation state of the tool shifter 60 corresponding to the timing diagram, and each drawing of FIGS. 10A, 11A and 12A is a side view and each drawing of FIGS. 10B, 11B and 12B is a plan view.

Here, the tool transporting arm 62 conducts intermittent indexing by reciprocal revolution oscillating every 180 having in between two stationary periods in respect to one rotation of the input shaft 22, and the point of origin of the hook 62a is when the transporting arm 62 is at the center (1) of the scope of revolution oscillation, the lifting position is at the lower end (4), and further the housing swinging position is at the center (6).

When the input shaft 22 rotates at a constant speed from the state at the point of origin, first at the a to b section the first output shaft 23 rotates normally and the transporting arm 62 revolves a predetermined angle (90 in the diagram) towards the tool rack side, then the opening portion of the hook 62a moves closer towards the tool 66 accommodated by the tool rack 64 (2).

Next, the revolution of the transporting arm 62 in the b to e section is stopped. At this time, within the b to e section there is a smaller section b to c in the first period where the second output shaft 24 rotates normally and the housing 21 swings towards the side the hook 62a is facing (7). By this the hook 62a moves to the transfer position P1 of the tool rack 64, and the hook 62a engages to the engaging groove 66a of the tool 66 which is in the transfer position P1 (2').

Thereafter, in the c to d section, the rotation of the second output shaft 24 stops and the housing 21 becomes a stationary state, the first output shaft 23 extends in the same section to move the transporting arm to the lower end position (4) to the upper end position (5), the tool 66 is taken out of the tool holder 70, and the first output shaft 23 is stopped in the d to h section thereafter of the upper and lower movement and maintained in the upper end position (5).

Within the above d to h section, the second output shaft 24 rotates in reverse in the d to e section, to return the housing 21 to the center position (6). Then, in the e to g section the rotation of the second output shaft 24 is stopped, the housing 21 is maintained in a center position (6), and further in the same e to g section the first output shaft 23 is rotated in reverse by 180, the transporting arm 62 is revolved towards the waiting magazine side, and the opening portion of the hook 62a at the tip end moves closer towards the empty tool holder 70 in the transfer position P2 of the waiting magazine (3).

Next, the second output shaft 24 in the next g to h section is reversely rotated, the housing 21 oscillates towards the side of the waiting magazine to which the hook 62a is facing (8), and thus the hook 62a moves to above the transfer position P2 of the waiting magazine, and matches the shaft core of the tool 66 to the shaft core of the empty tool holder 70 in the transfer position P2 (3').

In the following h to i section, the rotation of the second output shaft 24 is stopped and the housing 21 becomes in a stationary state. In the same h to i section, the first output shaft 23 contracts and the transporting arm 62 descends from an upper position (5) to a lower position (4), and the tool 66 is fitted and held in the empty holder 70 of the waiting magazine.

Then, in the next i to j section, the second output shaft 24 is rotated normally, the housing 21 is returned to a center position (6), the engagement between the hook 62a and the tool 66 is withdrawn and the hook 62a is pulled out of the tool 66 (3). In the subsequent j to k (a) section the first output shaft 23 is rotated normally, the transporting arm 62 is returned to the center (1), and returned to the point of origin.

Note that, in the above cycle, the case where the tool 66 is transported from the tool rack 64 side to the waiting magazine side is shown, but contrarily in the case where the tool 66 is transported from the waiting magazine side to the tool rack 64 side, the input shaft 22 should be rotated in reverse tracing the opposite to the above cycle. Further, in the case that the tool is subsequently transported from the tool rack side to the waiting magazine side, or in the opposite direction thereof, the input shaft 22 is rotated for multiple desired cycles continuously in the normal direction or the reverse direction, to continue to conduct the same cycle.

Therefore, in accordance with this tool shifter 60, the housing oscillating type cam apparatus 20 slides itself in order to make the position of the first output shaft 23 movable, and if the distance between shafts of the supporting shaft 40 and the first output shaft 23 is set as large, the locus of movement of the first output shaft 23 by the oscillation of the housing 21 may be made approximately a linear state as much as possible. Thus, even with a tool rack 47 which has a higher accommodation efficiency of the tool 66 by shortening the distance between the adjacent tools, interference with the adjacent tools may be avoided and the transporting arm 62 is easily detached in respect to the tool 66 by linearly extracting from the tool row side.

Figure 13:
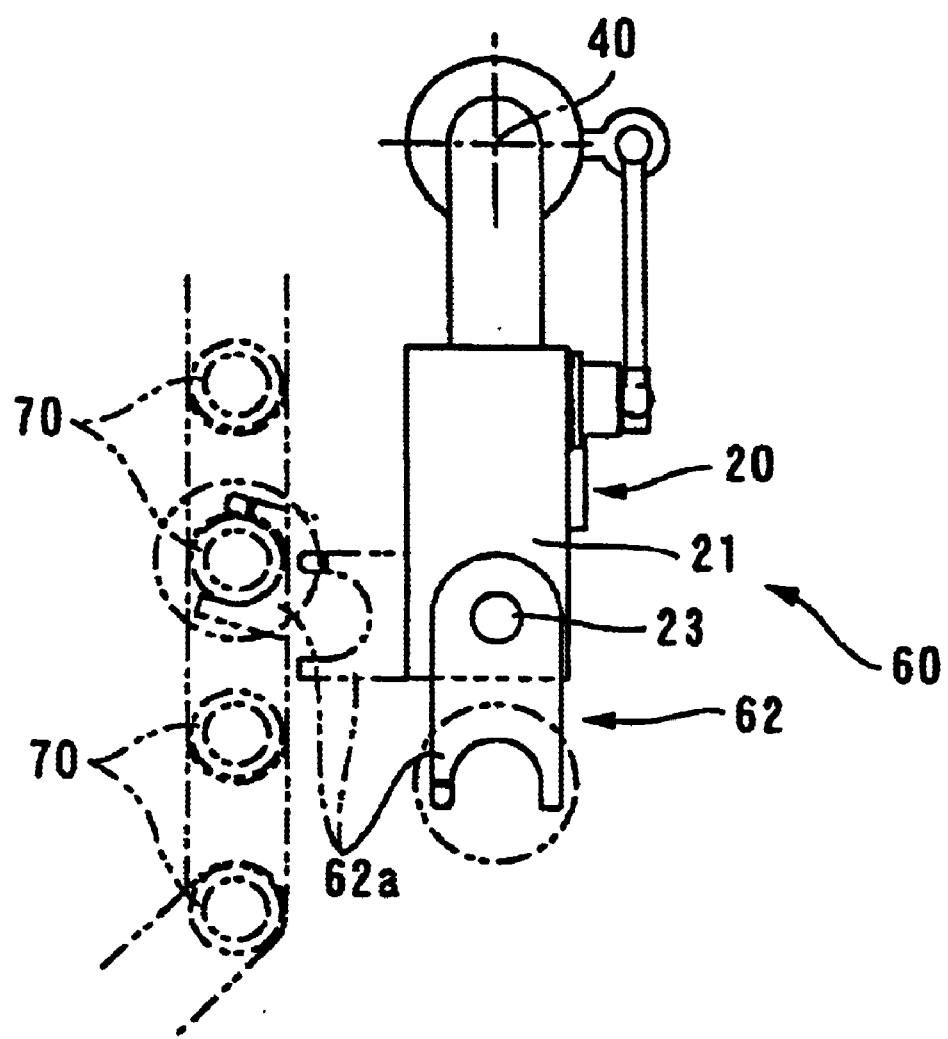
FIG. 13 is a diagram showing an example with the set up of a transfer position on a tool rack changed.

Accordingly, as in the case shown in FIG. 6, in addition to the corner of the tool rows being made as the transfer position P1, as shown in FIG. 13 even the middle of the linear portion of the tool rows may be made the transfer position P1 to conduct transferring of the tool 66.

Further, the oscillating movement of the housing 21 may be obtained from the rotational movement of the input shaft 22 of the cam apparatus 20, to be made in synchronous with the operation of the first output shaft 23. Therefore, it is not necessary as conventionally to use a complex structure to sequentially control a transporting arm 62 by a driving device such as an electric motor provided separately with a linearly contractable structure, and it is possible to make the tool shifter 60 more compact as well as reduce the manufacturing cost as much as possible.

Note that, the use of the housing oscillating type cam apparatus 20 of the present invention is not limited to the above work shifter, and is widely applicable in a case of transporting a workpiece between two work holding machines.

Thus, according to the present invention, the following excellent effects are obtained.

(1) In the housing oscillating type cam apparatus according to claim 1 in the invention, the first output shaft not only rotates and contracts and expands in the axial direction with the rotation of the input shaft, but the cam apparatus oscillatingly operates together with the housing. Therefore, the position on a plane of the first output shaft, may be mechanically controlled synchronously with the motion of the first output shaft, without separately providing a power source and to control thereof a complex electric circuit, an operation mechanism or the like, and further may be moved to make it as approximately linear as possible.

(2) In the housing oscillating type cam apparatus according to claim 2 in the invention, by the oscillating movement of the housing, the position on a plane of the first output shaft, may be mechanically controlled synchronously with the motion of the first output shaft, without using a complex electric circuit, and further may be moved to make it as linear as possible. Further, the rotation of the input shaft is converted to a rotation and contraction expansion motion of the first output shaft, and an oscillating motion of the housing, through a roller gear cam or a positive cam without saccadic movement such as a groove cam, so that a housing oscillating type cam apparatus with an extremely high movement accuracy and reliability is obtained.

(3) In the work shifter according to claim 3 in the invention, the housing oscillating type cam apparatus may swing itself to move the position of the first output shaft to as approximate to a linear shape, and also may obtain the oscillating motion from the rotation of the input shaft of the cam apparatus itself, to oscillate synchronously with the motion of the first output shaft. Thus, the transporting arm may be a mechanism which may contract linearly, and does not need to have a complex structure for sequential control with a driving device such as an electric motor provided separately, and may engage a transporting arm to multiple workpieces which are held near to the work holder, avoiding interference from neighboring workpieces, thus cost reduction of the work shifter is obtained. Further, by the oscillating movement of the housing, the workpiece may be moved for more than the length of the transporting arm, so that even in a case where there is a distance between the two work holding machines work transportation may be conducted accordingly thereto. Contrarily in a case where the distance is close, transportation of a workpiece may be conducted by forming the transportation arm to be short, and may be set in a space which is narrow.

What is claimed is:

1. A housing oscillating type cam apparatus comprising:
   an input shaft rotatably supported in a housing;
   a first output shaft rotatably supported in the axial direction to slidably move in the housing;
   a second output shaft rotatably supported in the housing;
   a first cam mechanism which transmits the rotation of the input shaft to the rotation movement of the first input shaft;
   a second cam mechanism which converts the rotation of the input shaft into a reciprocal movement in the axial direction of the first output shaft and transmits the reciprocal movement; and
   a third cam mechanism which converts the rotation of the input shaft into an oscillating rotation of the second output shaft and transmits the oscillation rotation, wherein
      the housing oscillating type cam apparatus rotatably supports the housing slidably in a fixed system as well as providing a link mechanism in between the second output shaft and the fixed system to convert the oscillating rotation of the second output shaft into an oscillating movement of the housing.

2. A housing oscillating type cam apparatus according to claim 1 wherein:
   the first output shaft is provided intersecting the input shaft perpendicularly:
   the second output shaft being provided parallel to the input shaft;
   the first cam mechanism comprises a roller gear cam fixed to the input shaft having a taper rib with a predetermined geometrical arm on the outer surface, a follower turret allowing movement in the axial direction of the first output shaft and provided to spline engage to the same shaft on the outer side of the first output shaft as well as being rotatably supported in the housing, and a cam follower provided on the outer surface of the follower turret and engaging in the taper rib of the roller gear cam;
   the second cam mechanism comprises an endless first groove cam provided at one surface of the roller gear cam and having a predetermined geometrical arm, and a first oscillating arm in which the supporting point rotatably supported in the housing, the point of force is engaged to the first groove cam as well as the point of action being engaged to the groove portion formed at the outer side of the first input shaft;
   the third cam mechanism comprises an endless second groove cam provided at the other surface of the roller gear cam having a predetermined geometrical arm, and a second oscillating arm of one end which is fixed to the inner side shaft of the second output shaft and the other end is engaged to the second groove cam; and
   the link mechanism comprises a third oscillating arm of one end which is fixed to the other side shaft of the second output shaft and the other end extends in the axial direction, and a connecting bar of which one end is rotatably supported to the extended end of the third oscillating arm and the other end is rotatably supported to the fixed system.

3. A work shifter provided in the center of the two work holder machines, the workpiece held in one of the work holder machines is transported to the other work holder machine, wherein
   the work shifter comprises a housing oscillating type cam apparatus according to claim 1, and a work transporting arm fixed to the first output shaft of the housing oscillating type cam apparatus and having a work holder at the tip end portion extending in the axial direction;
   the first output shaft revolves the tip end of the work transporting arm and alternatively stations towards both the work holder machine sides;
   the housing oscillating type cam apparatus oscillates and moves towards the tip end direction of the work transporting arm in the stationary period when the work transporting arm is stationary; and
   the first output shaft extends or contracts and slidingly moves during the stationary period of the housing oscillating type cam apparatus.

* * * * *